United States Patent
Harendt (10) Patent No.: US 10,502,557 B2
(45) Date of Patent: Dec. 10, 2019

(54) METHOD FOR THE THREE DIMENSIONAL MEASUREMENT OF A MOVING OBJECTS DURING A KNOWN MOVEMENT

(71) Applicants: Cognex Corporation, Natick, MA (US); Cognex Enshape GmbH, Jena (DE)

(72) Inventor: Bastian Harendt, Jena (DE)

(73) Assignee: Cognex Corporation, Natick, MA (US)

(*) Notice: Subject to any disclaimer, the term of this patent is extended or adjusted under 35 U.S.C. 154(b) by 0 days.

(21) Appl. No.: 16/224,693

(22) Filed: Dec. 18, 2018

(65) Prior Publication Data
US 2019/0128665 A1 May 2, 2019

Related U.S. Application Data (63) Continuation of application No. PCT/EP2017/065118, filed on Jun. 20, 2017.

(30) Foreign Application Priority Data

Jun. 20, 2016 (DE) .......................... 10 2016 111 229
Jun. 20, 2017 (DE) .......................... 10 2017 113 473

(51) Int. Cl.
*G01B 11/30* (2006.01)
*G01B 11/25* (2006.01)
(Continued)

(52) U.S. Cl.
CPC .............. *G01B 11/25* (2013.01); *G06T 7/285* (2017.01); *G06T 7/40* (2013.01); *G06T 7/97* (2017.01);
(Continued)

(58) Field of Classification Search
CPC . G01B 11/25; G01B 11/2513; G01B 11/2509; G01B 11/2527; G06T 7/0057
(Continued)

(56) References Cited

U.S. PATENT DOCUMENTS 15,229,991 8/2015 Cordray et al.
2004/0247174 A1* 12/2004 Lyons ................. G06F 3/04845
382/154
(Continued)

FOREIGN PATENT DOCUMENTS

DE 10 2011 101476 A1 11/2012
DE 102011101476 11/2012
(Continued)

OTHER PUBLICATIONS

International Search Report and Written Opinion dated Aug. 24, 2017 in connection with International Application No. PCT/EP2017/065118 and English translation thereof.
(Continued)

*Primary Examiner* — Md M Rahman
(74) *Attorney, Agent, or Firm* — Wolf, Greenfield & Sacks, P.C.

(57) ABSTRACT

A 3D measurement method including; projecting a pattern sequence onto a moving object; capturing a first image sequence with a first camera and a second image sequence synchronously to the first image sequence with a second camera; determining corresponding image points in the two sequences; computing a trajectory of a potential object point from imaging parameters and from known movement data for each pair of image points that is to be checked for correspondence, The potential object point is imaged by both image points in case they correspond. Imaging object positions derived therefrom at each of the capture points in time into image planes respectively of the two cameras. Corresponding image points positions are determined as trajectories in the two cameras and the image points are compared with each other along predetermined image point trajectories and examined for correspondence; lastly per-
(Continued)

forming 3D measurement of the moved object by triangulation.

18 Claims, 4 Drawing Sheets

(51) Int. Cl.
    *G06T 7/285*     (2017.01)
    *G06T 7/00*     (2017.01)
    *G06T 7/40*     (2017.01)

(52) U.S. Cl.
    CPC ............... *G06T 2207/10021* (2013.01); *G06T 2207/30241* (2013.01)

(58) Field of Classification Search
    USPC ......................................................... 356/603
    See application file for complete search history.

(56) References Cited

U.S. PATENT DOCUMENTS

| | | | |
|---|---|---|---|
| 2013/0163815 A1* | 6/2013 | Mai | G06T 7/20 382/103 |
| 2015/0229911 A1 | 8/2015 | Ge et al. | |
| 2017/0178358 A1* | 6/2017 | Greveson | G06K 9/00476 |

FOREIGN PATENT DOCUMENTS

| | | |
|---|---|---|
| DE | 10 2011 121696 A1 | 6/2013 |
| DE | 102011121696 | 6/2013 |
| WO | 2012/152261 A1 | 11/2012 |
| WO | 2013/087065 A1 | 6/2013 |

OTHER PUBLICATIONS

International Preliminary Report on Patentabiltiy dated Jan. 3, 2019 in connection with International Application No. PCT/EP2017/065118.
Breitbarth. Entwicklung con Mehtoden zur optischen 3D-Vermessung in Bewegung. Dissertation. Nov. 13, 2015. 165 pages.

* cited by examiner

METHOD FOR THE THREE DIMENSIONAL MEASUREMENT OF A MOVING OBJECTS DURING A KNOWN MOVEMENT

RELATED APPLICATIONS

This application is a continuation of International application PCT/EP2017/065118 filed on Jun. 20, 2017 claiming priority from priority from German patent application 10 2016 111 229.1, filed on Jun. 20, 2016, and German patent application 10 2017 113 473.5, filed on Jun. 20, 2017, all of which are incorporated in their entirety by this reference.

FIELD OF THE INVENTION

The invention relates to a method for three-dimensional measuring of moving objects performing a known movement. The method for three-dimensional measurement of a moving object during a known relative movement between the moving object and a measuring sensor including the steps of projecting a pattern sequence of N patterns onto the moving object, capturing a first image sequence of N images by a first camera and capturing a second image sequence of N images that is synchronous to the first image sequence by a second camera, determining corresponding image points in the first image sequence and in the second image sequence, computing a trajectory of a potential object point from imaging parameters of the camera system and from known movement data for each pair of image points of both cameras that is to be checked for correspondence wherein the potential object point is imaged by both image points in case both image points actually correspond to each other, imaging object positions derived therefrom at each of the N capture points in time into image planes respectively of the first and of the second camera, the image points are compared with each other along predetermined image point trajectories and examined for correspondence in the captured image sequences, and performing three-dimensional measurement of the moving object in a final step from the corresponding image points by triangulation. The positions of corresponding image points are determined as a first image point trajectory in the first camera and a second image point trajectory in the second camera. In one embodiment moving objects are measured on a conveyor belt wherein the sensor itself is fixed relative to the conveyor belt or large objects are being measured, wherein the 3-D sensor is continuously moved by a device, in particular a robot or a coordinate measuring machine along the object to be measured.

BACKGROUND OF THE INVENTION

Typically 3-D sensors with laser line triangulation are used for this application. These sensors are insensitive with respect to relative movements between object and sensor. However, in sensors of this type merely a line on the object to be measured in being measured. By moving the sensor or the object, however, many individual measurements can be performed that can be combined into a surface measurement.

However, it is also possible to use a surface 3-D sensor with two cameras and a projector that is used to project a pattern sequence. This is a photogrammetry method with a structured illumination that varies over time. A measurement can therefore detect a large surface so that a surface oriented 3-D measurement can be performed in a very short time, in particular compared to methods based on laser-line triangulation. However, methods of this type are very sensitive with respect to movements.

BRIEF SUMMARY OF THE INVENTION

Thus, it is an essential prerequisite for this method that each image point forms the same object point during the entire detection. Neither the measured object nor the sensor may move relative to each other during the measurement. There have been attempts to compensate movements during capturing a sample image sequence. One of these approaches is described in Harendt, B. Groebe, M.; Schaffer, M. & Kowarschik, R. "3D shape measurement of static and moving objects with adaptive spatiotemporal correlation applied Optics", 2014, 53, 7507-7515 or in Breitbarth, A. Kuehmstedt, P.; Notni, G. & Denzler, J. "Motion compensation for three-dimensional measurements of macroscopic objects using fringe projection" DGaO Proceedings, 2012, 113.

These known approaches use an iteration method. Initially a coarse non-movement sensitive measurement is performed. The results of the measurement are subsequently used to compensate the movement and to perform a point association using time based features.

A disadvantage of these approaches is the iteration method which strongly limits precision of the 3-D measurement.

Thus, it is an object of the invention to perform surface oriented 3-D capturing that is not sensitive relative to movements and on the other hand side to overcome the disadvantages of the iteration detection.

The object is achieved by a method for three-dimensional measurement of a moving object during a known relative movement between the moving object and a measuring sensor including the steps of projecting a pattern sequence of N patterns onto the moving object, capturing a first image sequence of N images by a first camera and capturing a second image sequence of N images that is synchronous to the first image sequence by a second camera, determining corresponding image points in the first image sequence and in the second image sequence, computing a trajectory of a potential object point from imaging parameters of the camera system and from known movement data for each pair of image points of both cameras that is to be checked for correspondence wherein the potential object point is imaged by both image points in case both image points actually correspond to each other, imaging object positions derived therefrom at each of the N capture points in time into image planes respectively of the first and of the second camera, the image points are compared with each other along predetermined image point trajectories and examined for correspondence in the captured image sequences, and performing three-dimensional measurement of the moving object in a final step from the corresponding image points by triangulation. The positions of corresponding image points are determined as a first image point trajectory in the first camera and a second image point trajectory in the second camera.

It is a prerequisite for this solution that information regarding the movement of the measured object relative to the sensor is known, e.g. when measuring an object on a conveyor belt or when measuring a static object with a sensor that is moved over the measured object by a robot.

The method for three-dimensional measurement of the moving object is performed with the following method steps when movement data is known.

A pattern sequence of N patterns is projected onto the moving object,

Thereafter capturing of a first image sequence of N images is performed by a first camera and capturing of a second image sequence of N images that is synchronous to the first image sequence is performed by a second camera.

Thereafter determining corresponding image points in the first image sequence and in the second image sequence is performed wherein trajectories of potential object points are computed from the known movement data and object positions derived therefrom are projected onto image planes respectively of the first and of the second camera, wherein the positions of corresponding image points are determined in advance as a first image point trajectory in the first camera and a second image point trajectory in the second camera.

The image points are compared with each other along predetermined image point trajectories and examined for correspondence. The three-dimensional measurement of the moving object is performed in a final step from the corresponding image points by triangulation.

When comparing the image points along the predetermined first and second image point trajectories a first gray scale sequence is determined in an embodiment in the first camera and a second gray scale sequence is determined in the second camera and a similarity of the first and the second gray scale sequence is determined.

Depending on the embodiment a similarity of gray scale sequences is determined by performing a standardized cross correlation, a sum of absolute differences and/or a phase evaluation.

In one embodiment a sequence of static patterns is used as a projected pattern sequence.

The projected pattern sequence can be, e.g., a sequence of phase shifted sine-shaped stripe patterns.

A static pattern can also be used as a projected pattern sequence wherein a projection of the static pattern on the measured object is varied at will with respect to its position and/or shape.

BRIEF DESCRIPTION OF THE DRAWINGS

The method will be subsequently described based on embodiments with reference to drawing figures, wherein.

DETAILED DESCRIPTION OF THE INVENTION

The method according to the invention is based on the following idea:

Under the presumption that it is known at which location an object point is at a certain point in time (position vector) and how the object point moves from there (displacement vector), it can be predetermined how a corresponding image point of the object point will move in a camera of a calibrated camera system. This information regarding the movement can be used in that associating corresponding image points is not done by comparing time-based gray scale sequences of fixed pixels with each other, but in that time-based gray scale sequences are compared with each other along the trajectories of the image points of an object point in the image planes of both cameras.

When there is a pure translatoric movement, a movement of all object points, thus their displacement vector, is identical. On a conveyor belt this movement can be determined in that the movement direction of the conveyor belt is calibrated. However, a movement of an image point in the camera is not predeterminable when a distance of the corresponding object point is unknown, namely the further the object point is remote from an image detection device, the smaller the displacement of the image point in the image plane. In addition to the movement information, information regarding a position of the object point is required in order to compensate a movement of the object point.

In principle it is possible to solve this problem by iteration and by initial coarse determination of the position vectors of all object points with a non-movement sensitive method and to estimate their trajectories in the images of both sensor cameras. This, however, is very imprecise.

The method according to the invention works without this iterative procedure. It rather uses the fact that comparing the gray scale sequences of two image points with one another includes actually implicitly checking whether the two image points depict the same object point. Thus it is checked implicitly whether the possible object point is at a predetermined location in space, namely at the location where the viewing beams of both image points intersect. When the viewing beams are skewed, this corresponds to the location that has the smallest distance from both viewing beams. When comparing image points the presumption is checked whether an object point is at the corresponding position in space.

Comparing two image points and presuming that the respective object point is actually at a position where the viewing beams of the two image points intersect at least approximately, it can be predetermined based on knowledge of the movement of the measured object how the respective image points in both cameras change when the object point moves. Initially the trajectory of the object point is construed from the position vector of the object point and from the movement data. The trajectory is then projected back into the image planes of both cameras using the calibration data of the camera system. Thus, it is computed for each capture point in time of the camera where the potential object point would be located at this point in time and the simulated 3-D position is introduced into the image planes of both cameras, this means projected.

Figure 1:
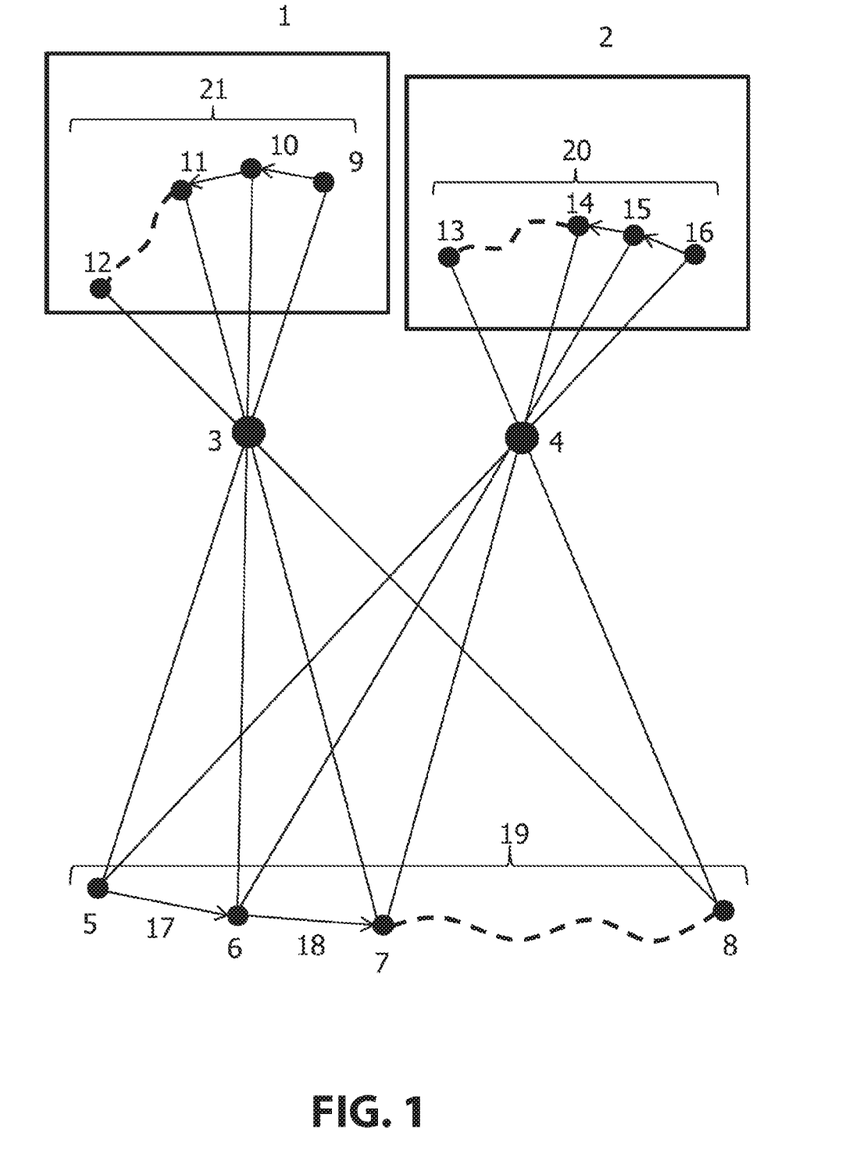
FIG. 1 illustrates a geometric representation of the method.
Figure 2:
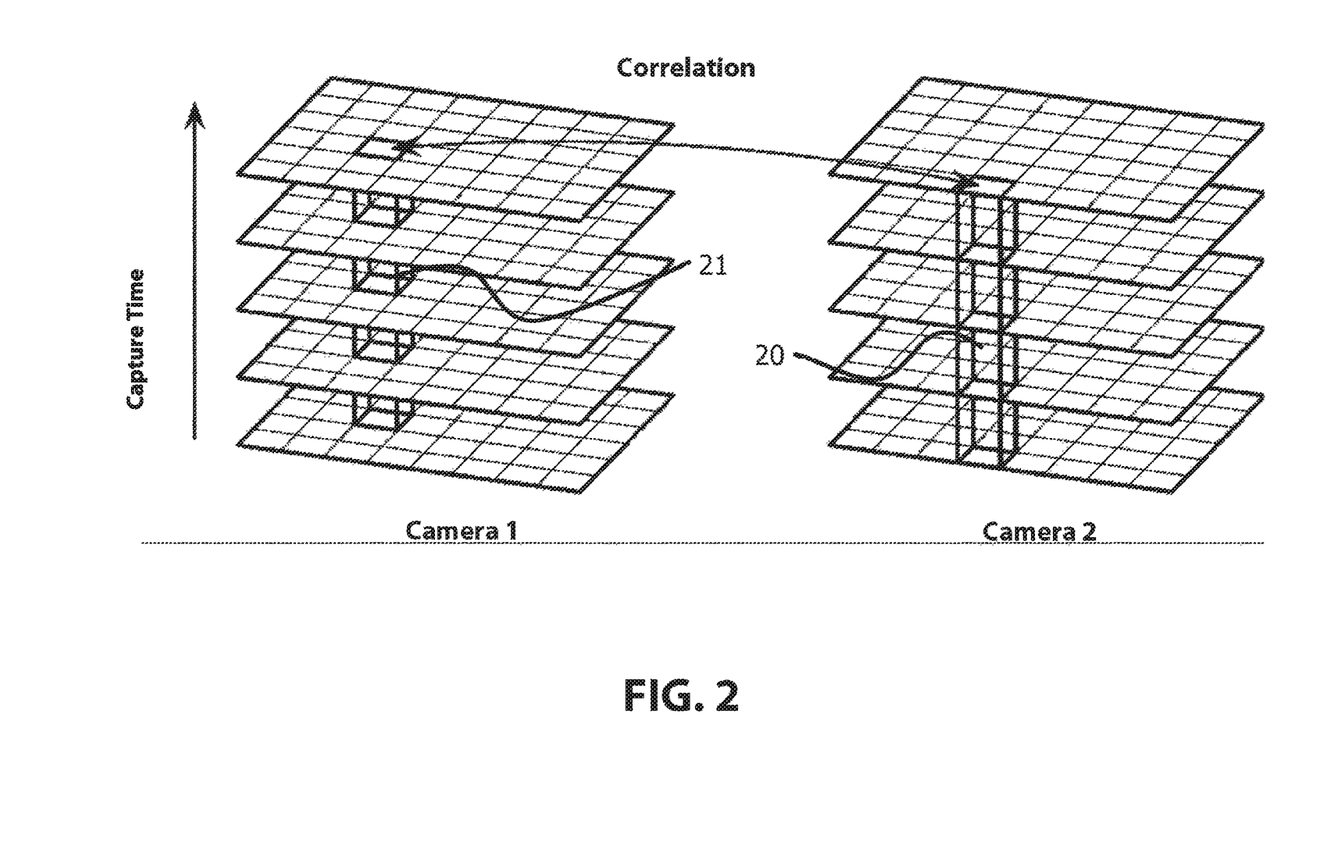
FIGS. 2 and 3 illustrate exemplary image point trajectories as a function of time.
Figure 3:
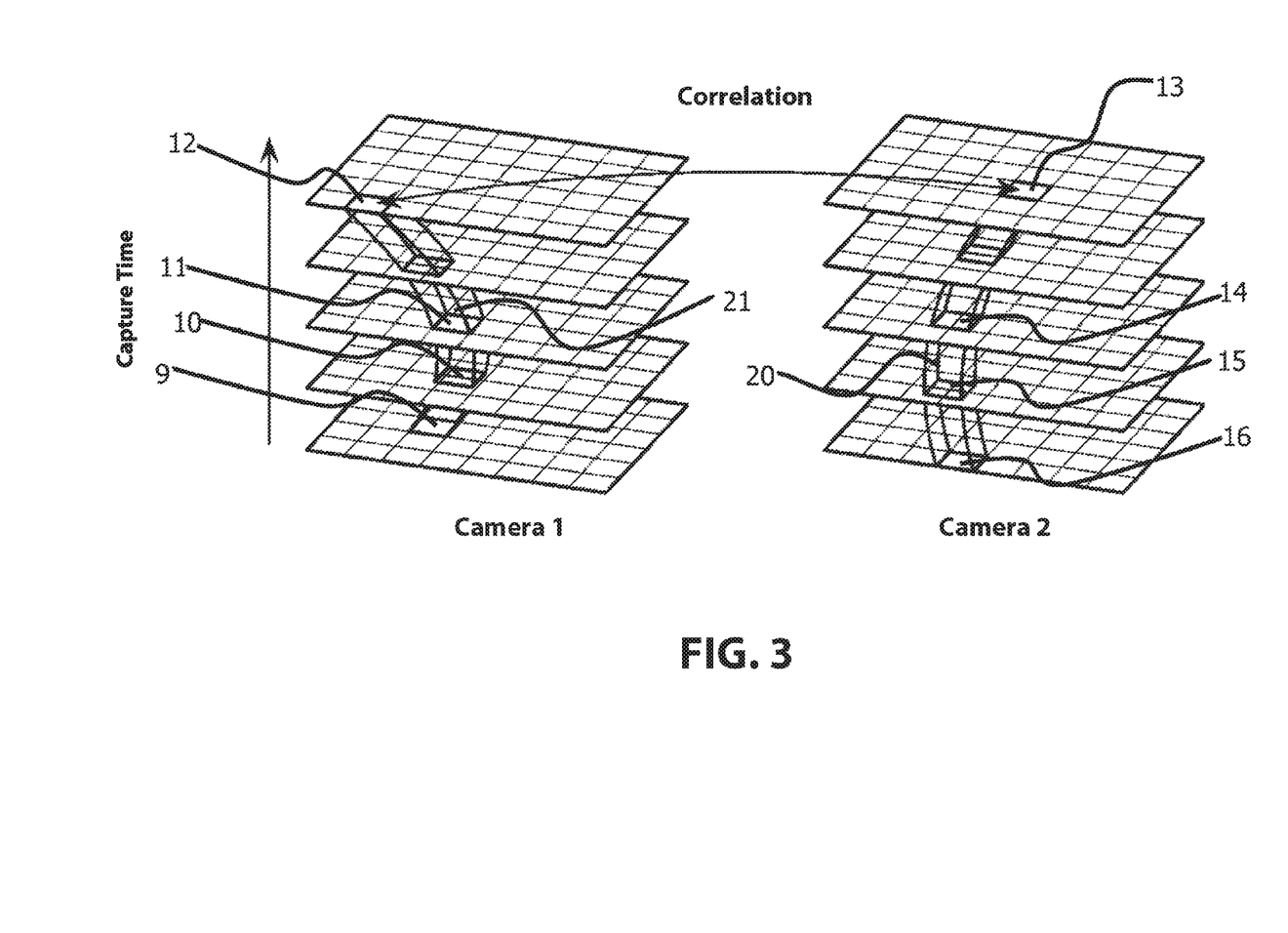

In order to check similarity of two image points the invention does not compare the time based gray scales at stationary image points in the image plane according to FIG. 2 like for static objects. Rather, gray scales along the time based image point trajectories according to FIGS. 1 and 3 are compared.

This method is certainly not limited to translatoric movements. Any movement of rigid measured objects, thus also rotating movements, can be compensated if the corresponding movement data is known. Theoretically also deformations of the object can be compensated if corresponding movement data can be obtained.

The method is performed as follows:

Initially information regarding the movement of the measured object is predetermined externally. For this purpose the movement direction of a conveyor belt can be calibrated in advance. The current movement velocity and/or position of the conveyor belt can be determined by an encoder of the conveyor belt or by another position measuring device.

Next, a sample image sequence of N images is projected and captured by two synchronous cameras. Thus, each camera captures an image sequence respectively with N images of the measured object with patterns projected onto it. During the capture the measured object moves with a known velocity.

The sample image sequence of N images can include for example of phase shifted sine shaped stripe patterns and/or of random patterns, e.g., band limited statistic patterns. The pattern sequence can also be generated in that an individual pattern is projected onto the measured object and changed there in any way with respect to position and/or shape, thus, e.g. a static pattern that is continuously moved on a circular path over the measured object. The latter example shows that the term "sample image sequence" must not be interpreted in a narrow manner so that a sample image sequence always has to consist of a discrete sequence of N different image patterns that are projected onto the measured object.

In the captured image sequences corresponding image points, this means image points that image the same object point, are being searched for by searching for each pixel of the first camera a pixel of the second camera which has the highest similarity with the first pixel.

The similarity of two pixels from two cameras is determined, e.g., as follows and reference is made to the illustration of FIG. 1:

Initially it is determined by triangulation where a corresponding object point 5 would be located when the two pixels 9 and 16 would actually image the same object point.

A trajectory 19 of the potential object point 5 is reconstrued in three dimensions from the known movement information of the measured object (e.g., 17 and 18) so that a potential position of the moved object point is known for each point in time of image capture t=1, 2, 3 . . . , N of the captured sample image sequence 5, 6, 7, . . . , 8, wherein the potential position of the moved object point is: P(t=1), P(t=2), P(t=3), . . . , P(t=N). This is emphasized by the reference numerals 5, 6, 7, . . . 8.

The position of the object point that is known at each point in time of capturing the sample image sequence is respectively projected back into the image planes 1 and 2 of the cameras with the projection centers 3 and 4. In the illustrated embodiment the aperture camera model is optically used, as a matter of principle, however, also other camera models are possible.

These projections yield trajectories 21 and 20 of the image points of the potential object point in the camera images. Thus, the position of the image points that would image the potential object point is known for both cameras and each point in time t of image capture. In particular, these are the image points B1(t=1), B1(t=2), B1(t=3) . . . , B1(t=N), thus indicated by the reference numerals 9, 10, 11, 12 for camera 1 and the image points B2(t=1), B2(t=2), B2(t=3), . . . , B2(t=N), thus indicated by the reference numerals 16, 15, 14 and 13 for camera 2.

Next, gray scale sequences along both image point trajectories 21, 20 are extracted, thus the gray scale sequence G1(t=1), G1(t=2), G1(t=3), . . . , G1(t=N), for camera 1 and the gray scale sequence G2(t=1), G2(t=2), G2(t=3), . . . , G2(t=N) for camera 2. For example G2(t=3) designates the gray scale value at the image point B2(t=3) in camera 2 in the third image of the capture sequence.

In FIG. 3 image point trajectories 21 and 20 are presented in a representation that plots location over time. With increasing capture time different image points are excited and a location of the excitation moves over the capture field of the respective camera. For comparison FIG. 2 shows a trajectory with location plotted over time where the image points respectively remain constant in space as the capture point in time progresses as it is the case for static measured objects. Both trajectories of FIG. 2 and FIG. 3 are associated with respective gray scale sequences and the two trajectories can be processed with the same procedure.

Since the image points are typically arranged at sub pixel locations the corresponding intensity values can also be interpolated from the intensity values of the adjacent pixels.

Next the similarity of the gray scale sequences is determined. As a measure for the similarity a standardized cross correlation can be used. Other similarity measures like e.g. the sum of absolute differences or a phase evaluation, however, are possible as well. A selection of the degree of similarity depends from the type of the projected patterns. For static patterns a standardized cross correlation may be used, for phase shifted sine shaped stripe patterns a phase evaluation is particularly advantageous.

An image point in camera 2 is associated with an image point in camera 1 as a corresponding image point when it has the highest level of similarity of all image points in camera 2 with respect to the image point in camera 1. Optionally the search portion in camera 1 can be limited to an optical or geometrically suitable detail, e.g. to a so called epipolar line.

When required point correspondences with maximum similarity can also be determined down to sub pixels. It is apparent that the described method for evaluating the similarity of two image points can also be used for sub pixel locations.

3D points are reconstrued from corresponding image points in a known manner by triangulation.

Depending at which point in time t=1, 2, 3, or N the measured object shall be reconstrued (B1(t=1), (B2(t=1), (B2(t=2), (B1(t=3), (B2(t=3), (B1(t=N), (B2(t=N), thus emphasized by the reference numerals (9, 16), (10, 15), (11, 14), . . . or (12, 13) have to be used as corresponding image point pairs during the triangulation.

The described method is not limited to translatoric movements. Rotations or combination of linear movement and rotation can be compensated as well.

The complexity of the image point trajectories 21 and 20 is a function of the complexity of the movement. For any linear movement and rotation, however position and shape of the trajectories are a function of the respective image point pair 9, 16. In case of a straight linear movement, e.g. for measuring objects on a conveyor belt the image point trajectories simplify into straight lines. This is the case in particular for non-distorting cameras which correspond to the aperture camera model.

Theoretically even any movements can be compensated, thus also deformations in case corresponding movement information can be determined and is provided. During linear movement and rotation this can be accomplished easily. For example when attaching a sensor at a robot and calibrating position and orientation of the sensor relative to the robot flange, in particular during a so called hand-eye calibration, the robot can signal an actual position and orientation of the sensor in the robot coordinate system at any point in time. From this information a trajectory in a moved sensor coordinate system can be determined for an object point that is unmoved with respect to the robot coordinate system.

The movement of a movable 3D-sensor relative to a static measured object can also be determined synchronously with capturing the measured object by the 3D sensor using additional sensors, not necessarily optical sensors. For example, markers can be attached on the primary 3D-sensor wherein a movement of the markers can be tracked with additional cameras and the position change of the 3D sensor relative to the static measured object is determined from the movement of the markers. This movement information can then be compensated by the described method during three-dimensional reconstruction of the measured object.

The relative movement of the 3D-sensor and the measured object can also be determined by the 3D-sensor itself. For example, statistic patterns can be used for pattern projection according to the described method and each synchronously captured stereo image pair (t=1, t=2, t=N) can be additionally separately processed by non-movement sensitive but coarse spatial correlation. As a result a rather coarse but tightly or imprecisely reconstrued point cloud of the measured object is achieved at each point in time of capture. t=1, t=2, t=N. However, when the point clouds of sequential points in time of capture t=1 and t=i+1 (i=1, 2, N−1) are brought into coincidence using an ICP method (iterative closest point) information is obtained regarding the relative movement, this means the linear movement and rotation of the measured object between t=i and t=i+1, and thus when this step is performed for i=1 through i=N−1 over the entire trajectory of the measured object from t=1 to t=N. This movement information can then be compensated in the context of the described method during three-dimensional construction of the measured object.

In analogy to the previously described approach for obtaining movement information the movement of the measured object relative to the 3D sensor can also be determined by an additional sensor that is fixed relative to the 3D sensor and calibrated relative to the 3D sensor. This additional sensor detects the measured object synchronously to the actual 3D-sensor and provides a coarse point cloud of the measured object for each point in time of capture t=1, t=2, t=N. Movement information can be obtained from the coarse point clouds in the previously described manner using the ICP method. It is an advantage of the additional sensor that it can be configured especially for the task of delivering precise movement information. This precise movement information can be based on non-movement sensitive methods which provide either few precise measuring points or many non-precise measuring points of the analyzed measuring object depending on which method provides the best movement information.

Figure 4:
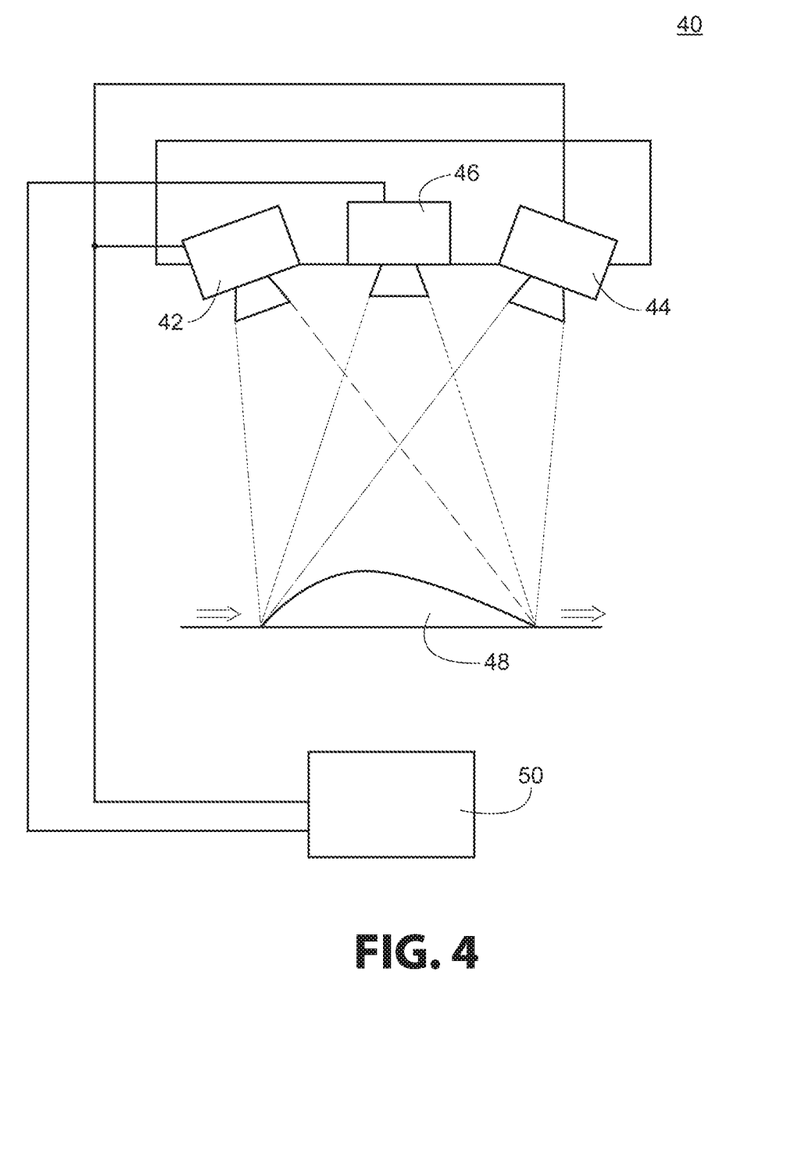
FIG. 4 illustrates a three-dimensional measurement system capable of implementing the method according the present invention.

FIG. 4 illustrates a three-dimensional measurement system 40 capable of implementing the method according to the present invention. The three-dimensional measurement system 40 includes a first camera 42, a second camera 44, a projector for projecting patterns 46, and a processor 48 such as a computer. The three-dimensional measurement system 40 uses the processor 48 to take the inputs from the first camera 42 and the second camera 44, in conjunction with the operation of the projector 46, to perform the three-dimensional measurement of a moving object according to the method of the invention.

The method according to the invention was described based on embodiments. A person skilled in the art will be able to combine the features of the invention into additional embodiments.

The invention claimed is:

1. A method for three-dimensional measurement of a moving object during a known relative movement between the moving object and a measuring sensor, the method comprising the steps:

projecting a pattern sequence of N patterns onto the moving object;

capturing a first image sequence of N images by a first camera and capturing a second image sequence of N images that is synchronous to the first image sequence by a second camera;

determining corresponding image points in the first image sequence and in the second image sequence;

computing a trajectory of a potential object point from imaging parameters of both cameras and from known movement data for each pair of image points of both cameras that is to be checked for correspondence, wherein the potential object point is imaged by both image points in case both image points actually correspond to each other;

imaging object positions derived therefrom at each of N capture points in time into image planes respectively of the first camera and of the second camera, wherein positions of the corresponding image points are determined as a first image point trajectory in the first camera and a second image point trajectory in the second camera and the image points are compared with each other along predetermined image point trajectories and examined for correspondence in the captured first and second image sequences;

performing three-dimensional measurement of the moving object in a final step from the corresponding image points by triangulation.

2. The method according to claim 1, further comprising the step:

comparing the image points along the predetermined first and second image point trajectories by determining a first gray scale sequence from the captured first image sequence of the first camera and a second gray scale sequence from the captured second image sequence of the second camera and determining a similarity of the first gray scale sequence and the second gray scale sequence.

3. The method according to claim 2, wherein determining the similarity of the first gray scale sequence and the second gray scale sequence includes using a standardized cross correlation, a sum of absolute differences, a phase processing or a comparable known measure of similarity for determining a correlation of gray scale sequences.

4. The method according to claim 1, wherein a sequence of static patterns is used as the projected sequence of N patterns.

5. The method according to claim 1, wherein a sequence of phase shifted sine shaped stripe patterns is used as the projected sequence of N patterns.

6. The method according to claim 1, wherein a static pattern is used as the projected sequence of N patterns, and wherein a projection of the static pattern onto the moving object is adjusted at will with respect to position or shape.

7. An apparatus for three-dimensional measurement of a moving object during a known relative movement between the moving object and a measuring sensor, the apparatus comprising a processor in communication with memory, the processor being configured to execute instructions stored in the memory that cause the processor to perform a method comprising the steps:

causing a projector to project a pattern sequence of N patterns onto the moving object;

causing a first camera to capture a first image sequence of N images and a second camera to capture a second image sequence of N images that is synchronous to the first image sequence;

determining corresponding image points in the first image sequence and in the second image sequence;

computing a trajectory of a potential object point from imaging parameters of both cameras and from known movement data for each pair of image points of both cameras that is to be checked for correspondence, wherein the potential object point is imaged by both image points in case both image points actually correspond to each other;

imaging object positions derived therefrom at each of N capture points in time into image planes respectively of the first camera and of the second camera, wherein positions of the corresponding image points are determined as a first image point trajectory in the first camera and a second image point trajectory in the second camera and the image points are compared with each other along predetermined image point trajectories and examined for correspondence in the captured first and second image sequences;

performing three-dimensional measurement of the moving object in a final step from the corresponding image points by triangulation.

8. The apparatus according to claim 7, further comprising the step:

comparing the image points along the predetermined first and second image point trajectories by determining a first gray scale sequence from the captured first image sequence of the first camera and a second gray scale sequence from the captured second image sequence of the second camera and determining a similarity of the first gray scale sequence and the second gray scale sequence.

9. The apparatus according to claim 8, wherein determining the similarity of the first gray scale sequence and the second gray scale sequence includes using a standardized cross correlation, a sum of absolute differences, a phase processing or a comparable known measure of similarity for determining a correlation of gray scale sequences.

10. The apparatus according to claim 7, wherein a sequence of static patterns is used as the projected sequence of N patterns.

11. The apparatus according to claim 7, wherein a sequence of phase shifted sine shaped stripe patterns is used as the projected sequence of N patterns.

12. The apparatus according to claim 7,
wherein a static pattern is used as the projected sequence of N patterns, and
wherein a projection of the static pattern onto the moving object is adjusted at will with respect to position or shape.

13. A non-transitory computer-readable storage medium storing instructions for three-dimensional measurement of a moving object during a known relative movement between the moving object and a measuring sensor that, when executed by a processor, cause the processor to perform a method comprising the steps:

projecting a pattern sequence of N patterns onto the moving object;

capturing a first image sequence of N images by a first camera and capturing a second image sequence of N images that is synchronous to the first image sequence by a second camera;

determining corresponding image points in the first image sequence and in the second image sequence;

computing a trajectory of a potential object point from imaging parameters of both cameras and from known movement data for each pair of image points of both cameras that is to be checked for correspondence, wherein the potential object point is imaged by both image points in case both image points actually correspond to each other;

imaging object positions derived therefrom at each of N capture points in time into image planes respectively of the first camera and of the second camera, wherein positions of the corresponding image points are determined as a first image point trajectory in the first camera and a second image point trajectory in the second camera and the image points are compared with each other along predetermined image point trajectories and examined for correspondence in the captured first and second image sequences;

performing three-dimensional measurement of the moving object in a final step from the corresponding image points by triangulation.

14. The non-transitory computer-readable storage medium according to claim 13, further comprising the step:

comparing the image points along the predetermined first and second image point trajectories by determining a first gray scale sequence from the captured first image sequence of the first camera and a second gray scale sequence from the captured second image sequence of the second camera and determining a similarity of the first gray scale sequence and the second gray scale sequence.

15. The non-transitory computer-readable storage medium according to claim 14, wherein determining the similarity of the first gray scale sequence and the second gray scale sequence includes using a standardized cross correlation, a sum of absolute differences, a phase processing or a comparable known measure of similarity for determining a correlation of gray scale sequences.

16. The non-transitory computer-readable storage medium according to claim 13, wherein a sequence of static patterns is used as the projected sequence of N patterns.

17. The non-transitory computer-readable storage medium according to claim 13, wherein a sequence of phase shifted sine shaped stripe patterns is used as the projected sequence of N patterns.

18. The non-transitory computer-readable storage medium according to claim 13,
wherein a static pattern is used as the projected sequence of N patterns, and
wherein a projection of the static pattern onto the moving object is adjusted at will with respect to position or shape.

* * * * *